(12) United States Patent
Garcia et al.

(10) Patent No.: US 9,227,501 B2
(45) Date of Patent: Jan. 5, 2016

(54) TRANSMISSION FOR A VEHICLE AND A METHOD OF ASSEMBLING A MODULAR MOTOR ASSEMBLY IN THE TRANSMISSION (71) Applicant: GM GLOBAL TECHNOLOGY OPERATIONS LLC, Detroit, MI (US)

(72) Inventors: Pete R Garcia, Troy, MI (US); Kent A. Miller, Pinckney, MI (US); John A. Diemer, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 308 days.

(21) Appl. No.: 13/657,127

(22) Filed: Oct. 22, 2012

(65) Prior Publication Data

US 2014/0111048 A1 Apr. 24, 2014

(51) Int. Cl.
*H02K 47/14* (2006.01)
*F16M 1/024* (2006.01)
*B23P 11/00* (2006.01)
*F16M 1/04* (2006.01)
*B60K 6/26* (2007.10)
*B60K 6/405* (2007.10)
*F16H 57/023* (2012.01)
(Continued)

(52) U.S. Cl.
CPC ... *B60K 6/26* (2013.01); *B60K 1/00* (2013.01); *B60K 6/405* (2013.01); *B60K 17/08* (2013.01); *F16H 57/023* (2013.01); *B23P 11/00* (2013.01); *F16H 2057/005* (2013.01); *F16H 2057/02034* (2013.01); *F16H 2057/02043* (2013.01); *F16M 1/024* (2013.01); *H02K 5/00* (2013.01); *H02K 5/04* (2013.01); *H02K 47/14* (2013.01); *Y10T 29/49826* (2015.01)

(58) Field of Classification Search
CPC ........ H02K 47/14; F16M 1/024; B23P 11/00; B60K 6/26; B60K 6/405; Y10T 29/49009
USPC ........ 310/68 B, 75 R, 76, 78, 89, 90, 92, 112, 310/113; 29/596
See application file for complete search history.

(56) References Cited

U.S. PATENT DOCUMENTS 3,177,387 A * 4/1965 Leischner ...................... 310/160
5,838,085 A * 11/1998 Roesel, Jr. ............... F02N 11/04
310/112

(Continued)

FOREIGN PATENT DOCUMENTS

CN 1727732 A 2/2006

*Primary Examiner* — Joshua Benitez-Rosario
*Assistant Examiner* — Rashad Johnson
(74) *Attorney, Agent, or Firm* — Quinn Law Group, PLLC (57) ABSTRACT

A transmission for a vehicle and a method of assembling a modular motor assembly in the transmission are disclosed. The transmission includes a housing defining a cavity along a longitudinal axis. The transmission further includes a first motor/generator and a second motor/generator each disposed in the cavity. The transmission also includes a first support supporting the first motor/generator such that the first motor/generator is mounted to the first support to define a first modular unit. The first modular unit is attached to the housing within the cavity. The transmission further includes a second support supporting the second motor/generator such that the second motor/generator is mounted to the second support to define a second modular unit. The second modular unit is attached to the first modular unit such that the first and second modular units align with each other along the longitudinal axis within the cavity of the housing.

16 Claims, 4 Drawing Sheets

(51) Int. Cl.
  *B60K 1/00*   (2006.01)
  *B60K 17/08*  (2006.01)
  *H02K 5/00*       (2006.01)
  *H02K 5/04*       (2006.01)
  *F16H 57/02*      (2012.01)
  *F16H 57/00*      (2012.01)

(56) References Cited

U.S. PATENT DOCUMENTS

| | | | |
|---|---|---|---|
| 5,990,590 A * | 11/1999 | Roesel, Jr. | F02N 11/04 310/112 |
| 6,022,287 A * | 2/2000 | Klemen et al. | 475/5 |
| 6,743,135 B2 * | 6/2004 | Klemen | B60K 6/365 180/65.235 |
| 7,402,923 B2 * | 7/2008 | Klemen | B60K 6/365 180/339 |
| 7,615,903 B2 * | 11/2009 | Holmes et al. | 310/90 |
| 8,102,087 B2 * | 1/2012 | Yamamoto | B60K 6/365 310/75 R |
| 8,294,318 B2 * | 10/2012 | Bando | H02K 16/00 310/112 |
| 2003/0064846 A1 * | 4/2003 | Klemen | B60K 6/365 475/5 |
| 2003/0148843 A1 * | 8/2003 | Bowen | B60K 6/26 475/5 |
| 2005/0206253 A1 * | 9/2005 | Hertz et al. | 310/68 B |
| 2007/0213161 A1 * | 9/2007 | Tabata et al. | 475/5 |
| 2008/0113846 A1 * | 5/2008 | Wiggen et al. | 477/3 |
| 2008/0258569 A1 * | 10/2008 | Kano | B60K 6/445 310/51 |
| 2009/0115263 A1 * | 5/2009 | Ihara | B60K 6/26 310/96 |
| 2009/0251029 A1 * | 10/2009 | Reinhart et al. | 310/425 |
| 2010/0139452 A1 * | 6/2010 | Holmes et al. | 74/606 R |
| 2010/0160103 A1 * | 6/2010 | Holmes | B60K 6/445 475/140 |
| 2010/0222171 A1 | 9/2010 | Tabata et al. | |
| 2012/0091835 A1 * | 4/2012 | Kim et al. | 310/54 |
| 2014/0041482 A1 * | 2/2014 | Knoth | H02K 5/20 74/665 A |
| 2014/0113760 A1 * | 4/2014 | Diemer | B60K 17/12 475/149 |

\* cited by examiner

TRANSMISSION FOR A VEHICLE AND A METHOD OF ASSEMBLING A MODULAR MOTOR ASSEMBLY IN THE TRANSMISSION

TECHNICAL FIELD

The present disclosure relates to a transmission for a vehicle and a method of assembling a modular motor assembly in the transmission of the vehicle.

BACKGROUND

Various transmissions have been developed for vehicles. Transmissions include numerous components disposed in a transmission casing. These components are individually assembled in the transmission casing which can be time consuming and laborious.

SUMMARY

The present disclosure provides a transmission for a vehicle. The transmission includes a housing defining a cavity along a longitudinal axis. The transmission further includes a first motor/generator and a second motor/generator each disposed in the cavity. The transmission also includes a first support supporting the first motor/generator such that the first motor/generator is mounted to the first support to define a first modular unit. The first modular unit is attached to the housing within the cavity. The transmission further includes a second support supporting the second motor/generator such that the second motor/generator is mounted to the second support to define a second modular unit. The second modular unit is attached to the first modular unit such that the first and second modular units align with each other along the longitudinal axis within the cavity of the housing.

The present disclosure also provides a method of assembling a modular motor assembly in a transmission of a vehicle. A housing defining a cavity along a longitudinal axis is provided. A first motor/generator is mounted to a first support to define a first modular unit and a second motor/generator is mounted to a second support to define a second modular unit. The first and second modular units define the modular motor assembly. The first and second modular units are inserted into the cavity of the housing along the longitudinal axis. The first support is attached to the housing within the cavity. Furthermore, the second support is attached to the first support to assemble the modular motor assembly in the transmission such that the first and second modular units align with each other along the longitudinal axis within the cavity of the housing.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
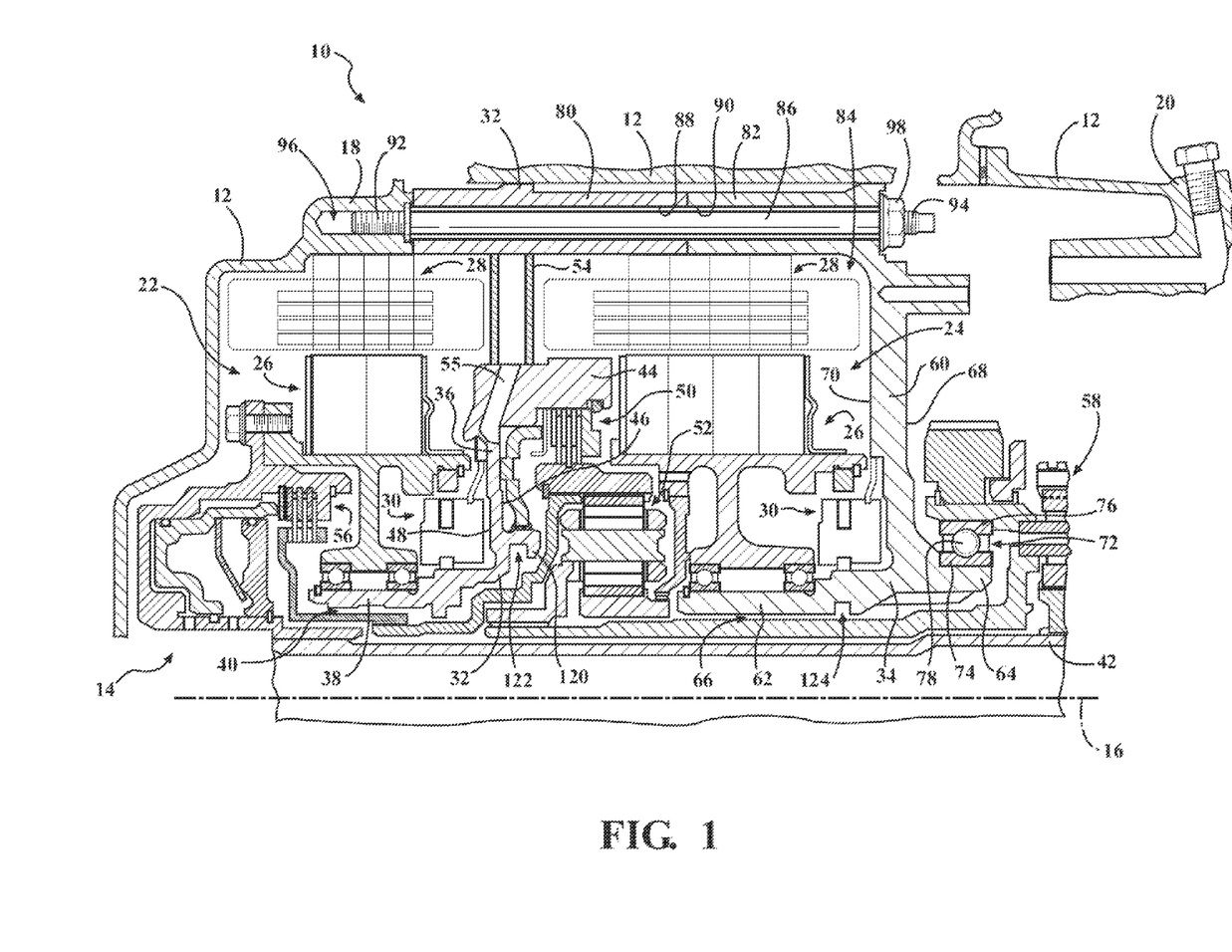
FIG. 1 is a schematic cross-sectional view of a transmission.

Referring to the Figures, wherein like numerals indicate like or corresponding parts throughout the several views, a transmission 10 for a vehicle is generally shown in FIG. 1.

With regard to FIG. 1, the transmission 10 includes a housing 12 defining a cavity 14 along a longitudinal axis 16. More specifically, the housing 12 can include a first distal wall 18 and a second distal wall 20 spaced from each other along the longitudinal axis 16, with the cavity 14 disposed between the first and second distal walls 18, 20. Even though the housing 12 is only partially shown in FIG. 1, it is to be appreciated that the housing 12 is generally annular to surround the entire transmission 10, with the first and second distal walls 18, 20 closing ends of the transmission 10. Hence, at least one of the first and second distal walls 18, 20 can be detached from the housing 12 to access the cavity 14 of the housing 12. It is to be appreciated that the housing 12 and the cavity 14 can be any suitable configuration.

The transmission 10 further includes a first motor/generator 22 and a second motor/generator 24 each disposed in the cavity 14. As suggested, the first motor/generator 22 can function as a motor or a generator. Similarly, the second motor/generator 24 can function as a motor or a generator. Generally, when functioning as a motor, power is supplied by a battery to start or drive the vehicle, and when functioning as a generator, power is stored in the battery for use at a later time. The transmission 10, which utilizes the first and second motor/generators 22, 24, is referred to as a hybrid vehicle transmission. It is to be appreciated that the transmission 10 can include other components not specifically discussed herein.

The first and second motor/generators 22, 24 each can include a rotor 26, a stator 28 and a resolver 30. Generally, the rotor 26 of the first motor/generator 22 is disposed between the stator 28 and the resolver 30 of the first motor/generator 22 transverse to the longitudinal axis 16. Similarly, the rotor 26 of the second motor/generator 24 is disposed between the stator 28 and the resolver 30 of the second motor/generator 24 transverse to the longitudinal axis 16. The rotor 26 of the first motor/generator 22 is rotatable about the longitudinal axis 16 independently of the stator 28 and the resolver 30 of the first motor/generator 22. Likewise, the rotor 26 of the second motor/generator 24 is rotatable about the longitudinal axis 16 independently of the stator 28 and the resolver 30 of the second motor/generator 24. The resolver 30 of the first motor/generator 22 can determine a position of the rotor 26 of the first motor/generator 22 before, during and after rotation of this rotor 26. Similarly, the resolver 30 of the second motor/generator 24 can determine a position of the rotor 26 of the second motor/generator 24 before, during and after rotation of this rotor 26.

When functioning as the motor, power stored in the battery is supplied to the stator 28 of the first and/or second motor/generators 22, 24. When functioning as the generator, torque from the rotor 26 rotating is converted to electrical power stored in the battery. It is to be appreciated that only a portion of the first and second motor/generators 22, 24 above the longitudinal axis 16 is shown schematically in FIG. 1, and those skilled in the art will recognize that these components are generally symmetrical about the longitudinal axis 16.

Figure 2:
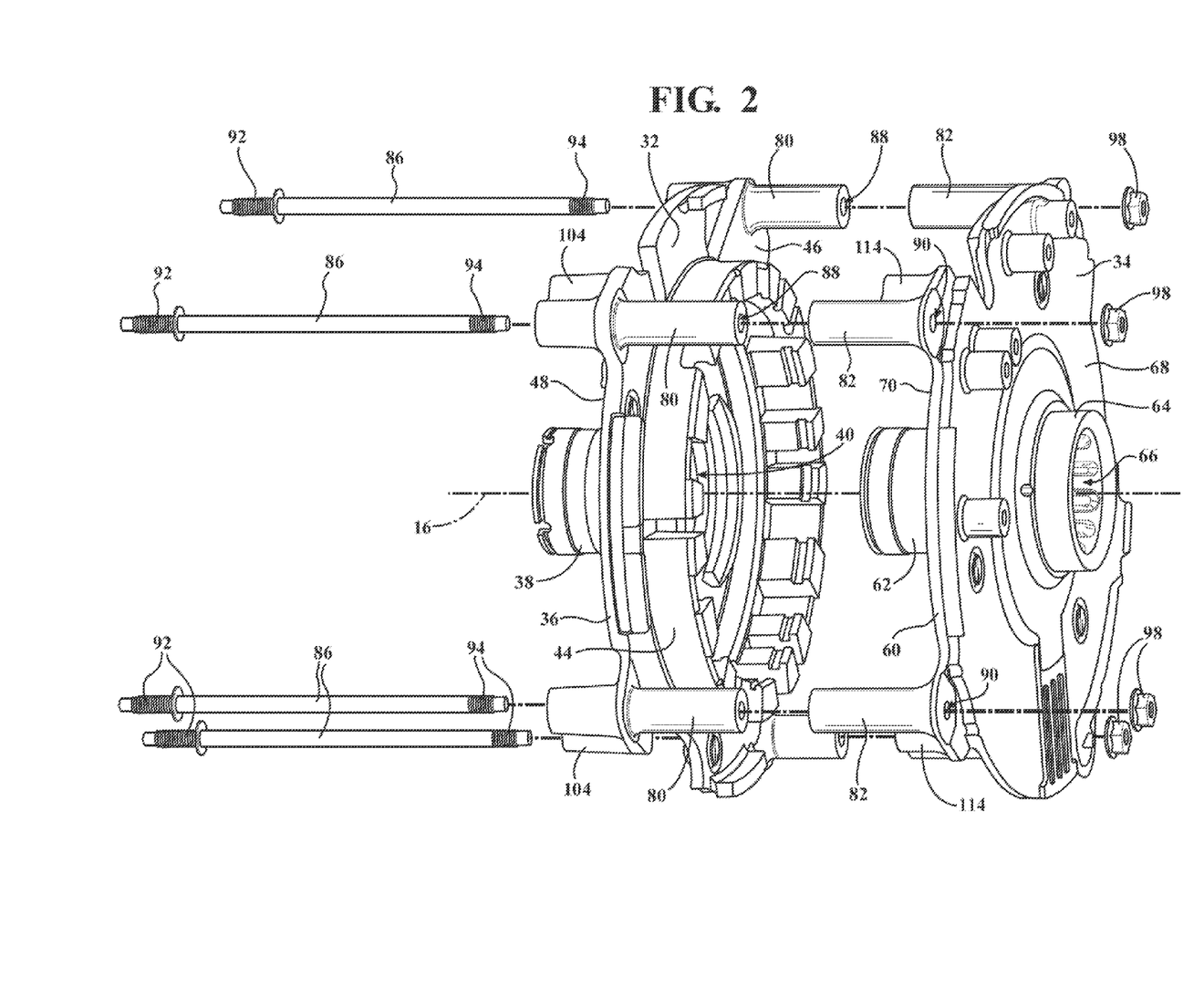
FIG. 2 is a schematic exploded view of a first support and a second support.
Figure 3:
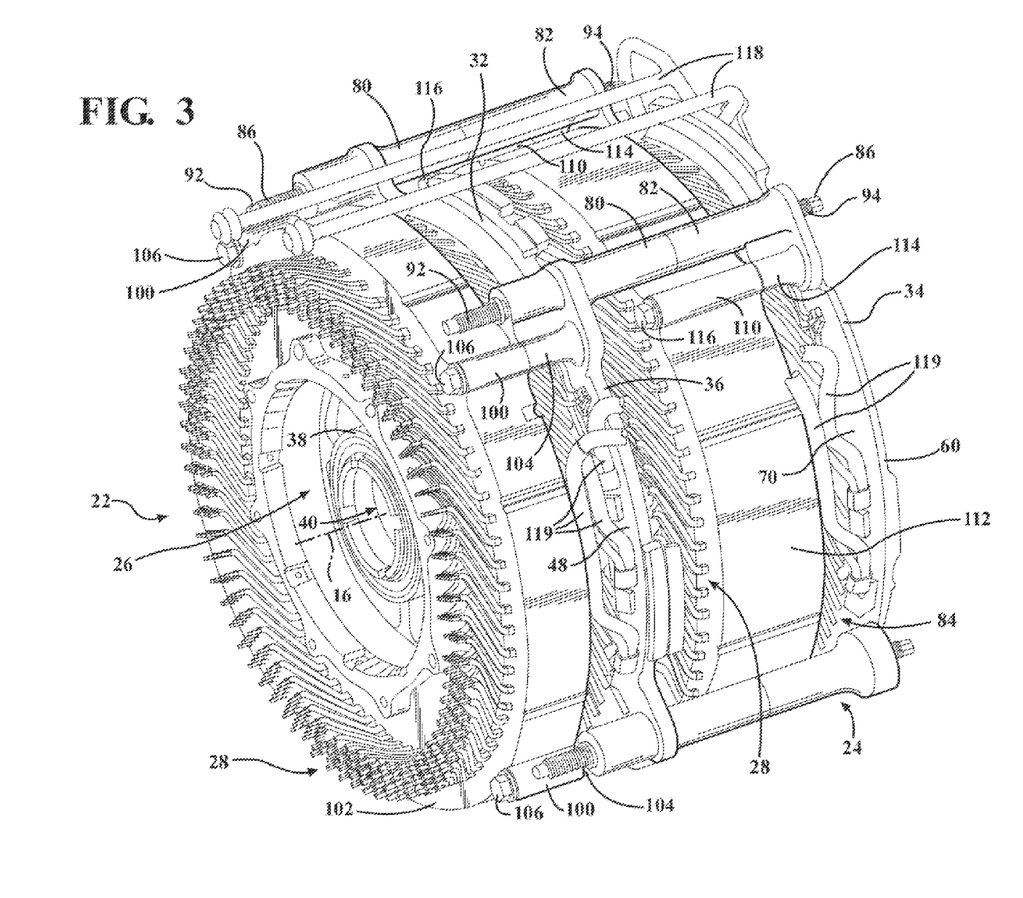
FIG. 3 is a schematic perspective view of a first motor/generator attached to the first support and a second motor/generator attached to the second support.

Referring to FIGS. 1-3, the transmission 10 also includes a first support 32 supporting the first motor/generator 22. The first motor/generator 22 is mounted to the first support 32 to define a first modular unit. The first modular unit is attached to the housing 12 within the cavity 14. Furthermore, the rotor 26, the stator 28 and the resolver 30 of the first motor/generator 22 is coupled to the first support 32 to further define the first modular unit. As such, the first modular unit including the rotor 26, the stator 28 and the resolver 30 of the first motor/generator 22, is attached to the housing 12 within the cavity 14. More specifically, the first modular unit is attached to one of the first and second distal walls 18, 20 within the cavity 14 to secure the first modular unit to the housing 12. In one embodiment, the first modular unit is attached to the first distal wall 18. The first modular unit provides a complete motor/generator sub-assembly which can be inserted into the cavity 14 and attached to the housing 12 as a unit. Thus, the first motor/generator 22 is arranged on the first support 32 to enhance packaging space of the first motor/generator 22. Furthermore, the first modular unit simplifies assembly of the first motor/generator 22 in the cavity 14 of the housing 12 by preassembling the first motor/generator 22 to the first support 32.

The transmission 10 further includes a second support 34 supporting the second motor/generator 24. The second motor/generator 24 is mounted to the second support 34 to define a second modular unit. Generally, the first modular unit is disposed between the housing 12 and the second modular unit within the cavity 14. More specifically, as discussed above, in one embodiment, the first modular unit is attached to the first distal wall 18; therefore, the first modular unit is generally disposed between the first distal wall 18 and the second modular unit. In certain embodiments, the rotor 26, the stator 28 and the resolver 30 of the second motor/generator 24 is coupled to the second support 34 to further define the second modular unit. As such, the second modular unit including the rotor 26, the stator 28 and the resolver 30 of the second motor/generator 24, is attached to the first modular unit within the cavity 14. The second modular unit provides a complete motor/generator sub-assembly which can be inserted into the cavity 14 as a unit. Thus, the second motor/generator 24 is arranged on the second support 34 to enhance packaging space of the second motor/generator 24. Furthermore, the second modular unit simplifies assembly of the second motor/generator 24 in the cavity 14 of the housing 12 by preassembling the second motor/generator 24 to the second support 34. In addition, the second modular unit is attached to the first modular unit such that the first and second modular units align with each other along the longitudinal axis 16 within the cavity 14 of the housing 12. Therefore, the first and second modular units can be inserted into the cavity 14 through the same side of the housing 12 to align the first and second modular units in the cavity 14. Aligning the first and second modular units along the longitudinal axis 16 enhances packaging space of the first and second motor/generators 22, 24 within the cavity 14 of the housing 12. FIG. 3 illustrates how the first and second modular units would look attached to each other when in the cavity 14. It is to be appreciated that only a portion of the first and second supports 32, 34 above the longitudinal axis 16 is shown schematically in FIG. 1, and those skilled in the art will recognize that these components are generally symmetrical about the longitudinal axis 16 as shown in FIGS. 2 and 3.

Generally, the first and second supports 32, 34 are formed of metal. In certain embodiments, the metal is an alloy. One suitable alloy is an aluminum alloy. It is to be appreciated that the first and second supports 32, 34 can be formed of any suitable metal or material.

As best shown in FIGS. 2 and 3, the first support 32 can include a first body 36 extending radially relative to the longitudinal axis 16. In certain embodiments, the first body 36 can include a first flange 38 extending away from the second modular unit such that the first motor/generator 22 is supported by the first body 36 and the first flange 38. In other embodiments, the first motor/generator 22 is supported by the first body 36 or the first flange 38. The first body 36 and the first flange 38 can define a first hole 40 along the longitudinal axis 16 which will be discussed further below.

Referring back to FIG. 1, the transmission 10 can also include a shaft 42 disposed within the cavity 14. Generally, the shaft 42 is disposed through the first hole 40 of the first body 36 and through the first hole 40 of the first flange 38 such that the first motor/generator 22 surrounds the shaft 42. In certain embodiments, the shaft 42 is rotatable about the longitudinal axis 16. It is to be appreciated that only a portion of the shaft 42 is shown schematically in FIG. 1, and those skilled in the art will recognize that this component is generally symmetrical about the longitudinal axis 16.

The first body 36 of the first support 32 can also include a first lip 44 extending toward the second modular unit. Generally, the first lip 44 and the first flange 38 oppose each other relative to the first body 36. In other words, the first lip 44 extends from a first side 46 of the first body 36 and the first flange 38 extends from a second side 48 of the first body 36, with the first and second sides 46, 48 opposing each other. In certain embodiments, the first flange 38 and the first lip 44 are offset from each other transverse to the longitudinal axis 16. It is to be appreciated that the first flange 38 and the first lip 44 can be any suitable configuration and location.

The transmission 10 can further include a clutch 50 (see FIG. 1) attached to the first lip 44 and a first planetary gear set 52 operatively coupled to the clutch 50. The clutch 50 is referred to as a first clutch 50 below. Generally, the first clutch 50 and the first planetary gear set 52 are disposed between the first and second motor/generators 22, 24. More specifically, the first clutch 50 and the first planetary gear set 52 are disposed between the resolver 30 of the first motor/generator 22 and the resolver 30 of the second motor/generator 24 along the longitudinal axis 16. Positioning the first clutch 50 and the first planetary gear set 52 between the first and second motor/generators 22, 24 enhances packaging of these components of the transmission 10 within the cavity 14 relative to the first and second modular units. In certain embodiments, the first clutch 50 and the first planetary gear set 52 are disposed along the first side 46 of the first body 36 and the rotor 26, the stator 28 and the resolver 30 of the first motor/generator 22 is disposed along the second side 48 of the first body 36.

Continuing with FIG. 1, a tube 54 can be disposed between the first and second motor/generators 22, 24, and more specifically, disposed between the stator 28 of the first and second motor/generators 22, 24, for supplying a fluid to the first clutch 50. Furthermore, the first support 32 can define a passageway 55 in fluid communication with the tube 54 and the first clutch 50 for supplying the fluid to the first clutch 50.

The first clutch 50 can be a stationary-type clutch or any other suitable type of clutch. The stationary-type clutch can also be referred to as a brake clutch. The first clutch 50 and the first planetary gear set 52 can be any suitable configuration. It is to be appreciated that only a portion of the first clutch 50 and the first planetary gear set 52 above the longitudinal axis 16 is shown schematically in FIG. 1, and those skilled in the art will recognize that these components are generally symmetrical about the longitudinal axis 16.

In certain embodiments, the transmission 10 can include a second clutch 56 attached to the first modular unit and a second planetary gear set 58 operatively coupled to the second clutch 56. More specifically, the second clutch 56 is attached to the rotor 26 of the first motor/generator 22. Generally, the second clutch 56 is disposed between the housing 12 and the first body 36 of the first support 32. Specifically, the second clutch 56 is disposed between the first distal wall 18 and the first body 36. The second clutch 56 can be pre-assembled to the first modular unit before inserting the first modular unit into the cavity 14 of the housing 12. Attaching the second clutch 56 to the first modular unit simplifies assembly of the second clutch 56 in the cavity 14 of the housing 12. The second clutch 56 is arranged on the second motor/generator 24 to enhance packaging space of this component of the transmission 10 within the cavity 14.

The second clutch 56 can be a rotating-type clutch or any other suitable type of clutch. The second clutch 56 and the second planetary gear set 58 can be any suitable configuration. It is to be appreciated that only a portion of the second clutch 56 and the second planetary gear set 58 about the longitudinal axis 16 is shown schematically in FIG. 1, and those skilled in the art will recognize that these components are generally symmetrical about the longitudinal axis 16.

Turning to FIGS. 2 and 3, the second support 34 can include a second body 60 extending radially relative to the longitudinal axis 16. In certain embodiments, the second body 60 can include a second flange 62 extending toward the first modular unit such that the second motor/generator 24 is supported by the second body 60 and the second flange 62. In other embodiments, the second motor/generator 24 is supported by the second body 60 or the second flange 62. Furthermore, the second body 60 of the second support 34 can include a second lip 64 extending away from the first modular unit such that the second lip 64 and the second flange 62 oppose each other relative to the second body 60. The second body 60, the second flange 62 and the second lip 64 can define a second hole 66 along the longitudinal axis 16. The shaft 42 is disposed through the second hole 66 of the second body 60, through the second hole 66 of the second flange 62 and through the second hole 66 of the second lip 64 such that the second motor/generator 24 surrounds the shaft 42. Therefore, the first and second modular units each surround the shaft 42 when disposed in the cavity 14 of the housing 12.

As mentioned above, the second lip 64 and the second flange 62 oppose each other relative to the second body 60. In other words, the second lip 64 extends from a first side 68 of the second body 60 and the second flange 62 extends from a second side 70 of the second body 60, with the first and second sides 68, 70 opposing each other. In certain embodiments, the second flange 62 and the second lip 64 are offset from each other transverse to the longitudinal axis 16. It is to be appreciated that the second flange 62 and the second lip 64 can be any suitable configuration and location.

Also referring to FIG. 1, the transmission 10 can further include a bearing device 72 mounted to the second lip 64. The bearing device 72 can include an inner race 74, an outer race 76 and a plurality of balls 78 or rollers disposed between the inner and outer races 74, 76. Generally, one of the inner and outer races 74, 76 is mounted to the second support 34. More specifically, the inner race 74 is mounted to the second lip 64 of the second support 34 such that the outer race 76 is rotatable relative to the inner race 74 and the balls 78 are rotatable between the inner and outer races 74, 76. The bearing device 72 can be a ball-bearing device, a roller-bearing device or any other suitable bearing device. It is to be appreciated that only a portion of the bearing device 72 above the longitudinal axis 16 is shown schematically in FIG. 1, and those skilled in the art will recognize that this component is generally symmetrical about the longitudinal axis 16.

As best shown in FIGS. 2 and 3, the first body 36 of the first support 32 can also include a first abutment 80 extending toward the second body 60 of the second support 34. Similarly, the second body 60 of the second support 34 can include a second abutment 82 extending toward the first body 36. As such, the first and second abutments 80, 82 are generally elongated and extend toward each other. Specifically, the first and second abutments 80, 82 align and engage each other to define a space 84 between the first and second bodies 36, 60. The second motor/generator 24 is disposed in the space 84 between the first and second bodies 36, 60. The first and second abutments 80, 82 position the first and second bodies 36, 60 relative to each other, and thus, positions the first and second motor/generators 22, 24 relative to each other. Furthermore, the first and second abutments 80, 82 can also support the first and second motor/generators 22, 24. It is to be appreciated that the first and second abutments 80, 82 can be any suitable configuration and location. It is to also be appreciated that optionally, one or more spacers can be disposed between the first and second bodies 36, 60 to define the space 84, with the spacer(s) coupled to one or both of the first and second supports 32, 34.

In certain embodiments, the first abutment 80 is further defined as a plurality of first abutments 80 and the second abutment 82 is further defined as a plurality of second abutments 82. Therefore, the first body 36 of the first support 32 can include the first abutments 80 spaced from each other radially relative to the longitudinal axis 16. Furthermore, the second body 60 of the second support 34 can include the second abutments 82 spaced from each other radially relative to the longitudinal axis 16. Each of the first abutments 80 extend toward the second body 60 of the second support 34 and each of the second abutments 82 extend toward the first body 36 of the first support 32. As such, respective first and second abutments 80, 82 align and engage each other to define the space 84 between the first and second bodies 36, 60. As indicated above, the second motor/generator 24 is disposed in the space 84 between the first and second bodies 36, 60. Again, as mentioned above, it is to be appreciated that the first and second abutments 80, 82 can be any suitable configuration and location.

In certain embodiments, a portion of the first and second supports 32, 34 can abut the housing 12, and more specifically, in certain embodiments, a portion of the first and second abutments 80, 82 can abut the housing 12 to ground the first and second motor/generators 22, 24. In other words, generally, the stator 28 of the first motor/generator 22 can be grounded to the housing 12 through the first support 32, and likewise, the stator 28 of the second motor/generator 24 can be grounded to the housing 12 through the second support 34. Simply stated, the stator 28 of the first and second motor/generators 22, 24 can each be grounded to the housing 12. Specifically, in certain embodiments, the stator 28 of the first motor/generator 22 can be grounded to the housing 12 through the first abutment 80, and likewise, the stator 28 of the second motor/generator 24 can be grounded to the housing 12 through the second abutment 82. It is to be appreciated that the stator 28 of the second motor/generator 24 can be grounded to the housing 12 through the first and second supports 76, 78.

Referring to FIGS. 1 and 2, the transmission 10 can further include a coupler 86 disposed through the first and second abutments 80, 82 to secure the first and second modular units to each other within the cavity 14 of the housing 12. In addition, the coupler 86 secures the first and second modular units to the inside of the housing 12. In certain embodiments, the coupler 86 is further defined as a plurality of couplers 86 disposed through respective first and second abutments 80, 82. In other words, one of the couplers 86 is disposed through one pair of the first and second abutments 80, 82, and another one of the couplers 86 is disposed through another pair of the first and second abutments 80, 82, etc., to secure the first and second modular units to each other within the cavity 14 of the housing 12. Furthermore, the couplers 86 secure the first and second modular units to the inside of the housing 12. Therefore, the same couplers 86 are utilized to secure the first and second modular units to each other and to the housing 12 within the cavity 14. The couplers 86 are generally elongated and extend along the longitudinal axis 16. In one embodiment, the couplers 86 are substantially parallel to the longitudinal axis 16. It is to be appreciated that the couplers 86 can be any suitable configuration, orientation and location.

In certain embodiments, each of the first abutments 80 can define a first aperture 88 along the longitudinal axis 16 and each of the second abutments 82 can define a second aperture 90 along the longitudinal axis 16. Therefore, in one embodiment, the first and second apertures 88, 90 are spaced from and substantially parallel to the longitudinal axis 16. Furthermore, one of the first apertures 88 cooperate with one of the second apertures 90, and similarly, another one of the first apertures 88 cooperate with another one of the second apertures 90, etc. Hence, one of the couplers 86 is disposed through a pair of the first and second apertures 88, 90 and another one of the couplers 86 is disposed through another pair of the first and second apertures 88, 90, etc.

In various embodiments, the coupler 86, and more specifically the couplers 86, are further defined as a plurality of studs including a first end 92 and a second end 94 spaced from each other along the longitudinal axis 16. Hence, generally, the couplers 86 include the first and second ends 92, 94. The first and second abutments 80, 82 are disposed between the first and second ends 92, 94 of the studs. The first end 92 of each of the studs are attached to the housing 12 within the cavity 14 to secure the first and second modular units to the housing 12. More specifically, in certain embodiments, the first end 92 of each of the studs are attached to the first distal wall 18 to secure the first and second modular units to the housing 12. It is to be appreciated that the couplers 86 can be further defined as bolts, screws, rods, posts, fasteners or any other suitable couplers.

Referring to FIG. 1, the housing 12 can define a bore 96 along the longitudinal axis 16 for receiving the coupler 86, and more specifically, for receiving the first end 92 of the stud. In certain embodiments, the bore 96 can be defined as a plurality of bores 96, with the first end 92 of one of the studs disposed in one of the bores 96 and the first end 92 of another one of the studs disposed in another one of the bores 96, etc. Furthermore, in certain embodiments, one of the first and second distal walls 18, 20 can define the bores 96. In one embodiment, the first distal wall 18 defines the bores 96. The bores 96 can be threaded and the first end 92 of each of the couplers 86 can be correspondingly threaded to cooperate with the threaded bores 96. As such, the couplers 86 can be threaded into the bores 96 to attach the couplers 86 to the housing 12. It is to be appreciated that the couplers 86 can be attached to the housing 12 by any suitable methods.

The transmission 10 can further include a connector 98 attached to the coupler 86. Generally, the connector 98 is attached to the second end 94 of the coupler 86. More specifically, the connector 98 can be attached to the stud, such as, the second end 94 of the stud. In certain embodiments, the connector 98 is further defined as a plurality of connectors 98. As such, one of the connectors 98 is attached to the second end 94 of one of the couplers 86. In addition, another one of the connectors 98 is attached to the second end 94 of another one of the couplers 86. The connectors 98 secure the first and second modular units to each other, and additionally, the connectors 98 prevent the first and second supports 32, 34 from detaching from the couplers 86. Furthermore, the connectors 98 sandwich the first and second supports 32, 34 between the housing 12 and the connectors 98. In certain embodiments, the second end 94 of the couplers 86 are threaded and the connectors 98 are threaded to cooperate with the threaded couplers 86. In addition, in certain embodiments, the connectors 98 are further defined as nuts, pins, c-clamps or any other suitable connectors.

Turning to FIGS. 1 and 3, the first motor/generator 22 can include a first mounting flange 100 attached to the first support 32 to secure the first motor/generator 22 to the first support 32. More specifically, the stator 28 of the first motor/generator 22 can include the first mounting flange 100 attached to the first support 32 to secure the first motor/generator 22 to the first support 32. In certain embodiments, the first mounting flange 100 is further defined as a plurality of first mounting flanges 100 spaced from each other radially relative to the longitudinal axis 16. The first mounting flanges 100 are attached to the first support 32 to secure the first motor/generator 22 to the first support 32. In one embodiment, the first mounting flanges 100 are attached to a laminate 102 of the stator 28 of the first motor/generator 22. It is to be appreciated that the first mounting flanges 100 can be any suitable configuration and location.

The first support 32 can include a first extension 104 extending away from the second modular unit. Generally, the first extension 104 aligns with the first mounting flange 100 to secure the first motor/generator 22 to the first support 32. In certain embodiments, the first extension 104 is further defined as a plurality of first extensions 104 spaced from each other radially relative to the longitudinal axis 16, with each of the first extensions 104 extending away from the second modular unit. The first extensions 104 align with respective first mounting flanges 100 to secure the first motor/generator 22 to the first support 32. In certain embodiments, the first extensions 104 are disposed adjacent to respective first abutments 80. Furthermore, in certain embodiments, the first extensions 104 can extend from the first body 36 of the first support 32. It is to be appreciated that the first extensions 104 can be any suitable configuration and location.

Generally, a first fastener 106 is disposed through the first extension 104 and the first mounting flange 100 to secure the first motor/generator 22 and the first support 32 to each other. In certain embodiments, the first fastener 106 is further defined as a plurality of first fasteners 106 disposed through the first extensions 104 and the first mounting flanges 100. More specifically, one of the first fasteners 106 is disposed through one of the first extensions 104 and the corresponding one of the first mounting flanges 100, and similarly, another one of the first fasteners 106 is disposed through another one of the first extensions 104 and the corresponding another one of the first mounting flanges 100, etc., to secure the first motor/generator 22 and the first support 32 to each other. In other words, the first fasteners 106 secure the first motor/generator 22 and the first support 32 to each other such that the first support 32 supports the first motor/generator 22. The first fasteners 106 can be defined as bolts, rods, screws, posts, studs, or any other suitable fasteners. It is to be appreciated that the first extensions 104 and the first mounting flanges 100 can each define a first opening for receiving respective first fasteners 106 to secure the first motor/generator 22 and the first support 32 to each other.

Continuing with FIGS. 1 and 3, the second motor/generator 24 can include a second mounting flange 110 attached to the second support 34 to secure the second motor/generator 24 to the second support 34. More specifically, the stator 28 of the second motor/generator 24 includes the second mounting flange 110 attached to the second support 34 to secure the second motor/generator 24 to the second support 34. In certain embodiments, the second mounting flange 110 is further defined as a plurality of second mounting flanges 110 spaced from each other radially relative to the longitudinal axis 16. The second mounting flanges 110 are attached to the second support 34 to secure the second motor/generator 24 to the second support 34. In one embodiment, the second mounting flanges 110 are attached to a laminate 112 of the stator 28 of the second motor/generator 24. It is to be appreciated that the second mounting flanges 110 can be any suitable configuration and location.

The second support 34 includes a second extension 114 extending toward the first modular unit. Generally, the second extension 114 aligns with the second mounting flange 110 to secure the second motor/generator 24 to the second support 34. In certain embodiments, the second extension 114 is further defined as a plurality of second extensions 114 spaced from each other radially relative to the longitudinal axis 16, with each of the second extensions 114 extending toward the first modular unit. The second extensions 114 align with respective second mounting flanges 110 to secure the second motor/generator 24 to the second support 34. In certain embodiments, the second extensions 114 are disposed adjacent to respective second abutments 82. Furthermore, in certain embodiments, the second extensions 114 can extend from the second body 60 of the second support 34. It is to be appreciated that the second extensions 114 can be any suitable configuration and location.

Generally, a second fastener 116 is disposed through the second extension 114 and the second mounting flange 110 to secure the second motor/generator 24 and the second support 34 to each other. In certain embodiments, the second fastener 116 is further defined as a plurality of second fasteners 116 disposed through the second extensions 114 and the second mounting flanges 110. More specifically, one of the second fasteners 116 is disposed through one of the second extensions 114 and the corresponding one of the second mounting flanges 110, and similarly, another one of the second fasteners 116 is disposed through another one of the second extensions 114 and the corresponding another one of the second mounting flanges 110, etc., to secure the second motor/generator 24 and the second support 34 to each other. In other words, the second fasteners 116 secure the second motor/generator 24 and the second support 34 to each other such that the second support 34 supports the second motor/generator 24. The second fasteners 116 can be defined as bolts, rods, screws, posts, studs, or any other suitable fasteners. It is to be appreciated that the second extensions 114 and the second mounting flanges 110 can each define a second opening for receiving respective second fasteners 116 to secure the second motor/generator 24 and the second support 34 to each other.

It is to be appreciated that the transmission 10 can include other components, such as one or more cooling tubes 118 (see FIG. 3) for cooling the first and second motor/generators 22, 24 and one or more wires 119 (see FIG. 3) coupled to each stator 28 of the first and second motor/generators 22, 24 for electrically connecting the stator 28 of the first and second motor/generators 22, 24 with other components of the vehicle, etc. As briefly mentioned above, the transmission 10 can include other components not specifically discussed herein.

Generally, the first and second modular units define a modular motor assembly configured to be assembled in the cavity 14 of the housing 12 of the transmission 10. Hence, the first modular unit is inserted into the cavity 14 of the housing 12 as a unit, and similarly, the second modular unit is inserted into the cavity 14 of the housing 12 as a unit. As discussed above, the first modular unit provides a complete motor/generator sub-assembly to be inserted into the cavity 14 and attached to the housing 12 as a unit, thus the first and second motor/generators 22, 24 are arranged on the first and second supports 32, 34 respectively to enhance packaging space of the first and second motor/generators 22, 24. Furthermore, the first and second modular units simplify assembly of the first and second motor/generators 22, 24 in the cavity 14 of the housing 12 by preassembling the first motor/generator 22 to the first support 32 and the second motor/generator 24 to the second support 34. In addition, the second modular unit is attached to the first modular unit such that the first and second modular units align with each other along the longitudinal axis 16 within the cavity 14 of the housing 12. Aligning the first and second modular units along the longitudinal axis 16 enhances packaging space of the first and second motor/generators 22, 24 within the cavity 14 of the housing 12. Additionally, by packaging the first and second motor/generators 22, 24 as discussed above, the first and second motor/generators 22, 24 can be tested and analyzed remotely from the housing 12 of the transmission 10. Furthermore, the packaging of the first and second motor/generators 22, 24 provide effective performance of the first and second motor/generators 22, 24. Simply stated, the modular motor assembly provides advantages for packaging, performance, manufacturability and final assembly of the transmission 10.

To insert the first modular unit into the cavity 14, the first support 32 includes a finger 120 defining a groove 122 transverse to the longitudinal axis 16. Generally, the finger 120 is spaced from the first lip 44 and the first flange 38. In certain embodiments, the finger 120 extends from the first side 46 of the first body 36 and the groove 122 of the finger 120 is disposed radially relative to the longitudinal axis 16. A machine or robot engages the finger 120, and more specifically engages the groove 122, to move, insert and position the first modular unit in the cavity 14. It is to be appreciated that the finger 120 or the groove 122 can be in any suitable configuration and location.

To insert the second modular unit into the cavity 14, the second support 34 defines a slot 124 transverse to the longitudinal axis 16. More specifically, the second flange 62 of the second support 34 defines the slot 124. In certain embodiments, the slot 124 is disposed radially relative to the longitudinal axis 16. The machine or robot engages the second flange 62, and more specifically, engages the slot 124, to move, insert and position the second modular unit in the cavity 14. It is to be appreciated that the slot 124 can be any suitable configuration and location.

Figure 4:
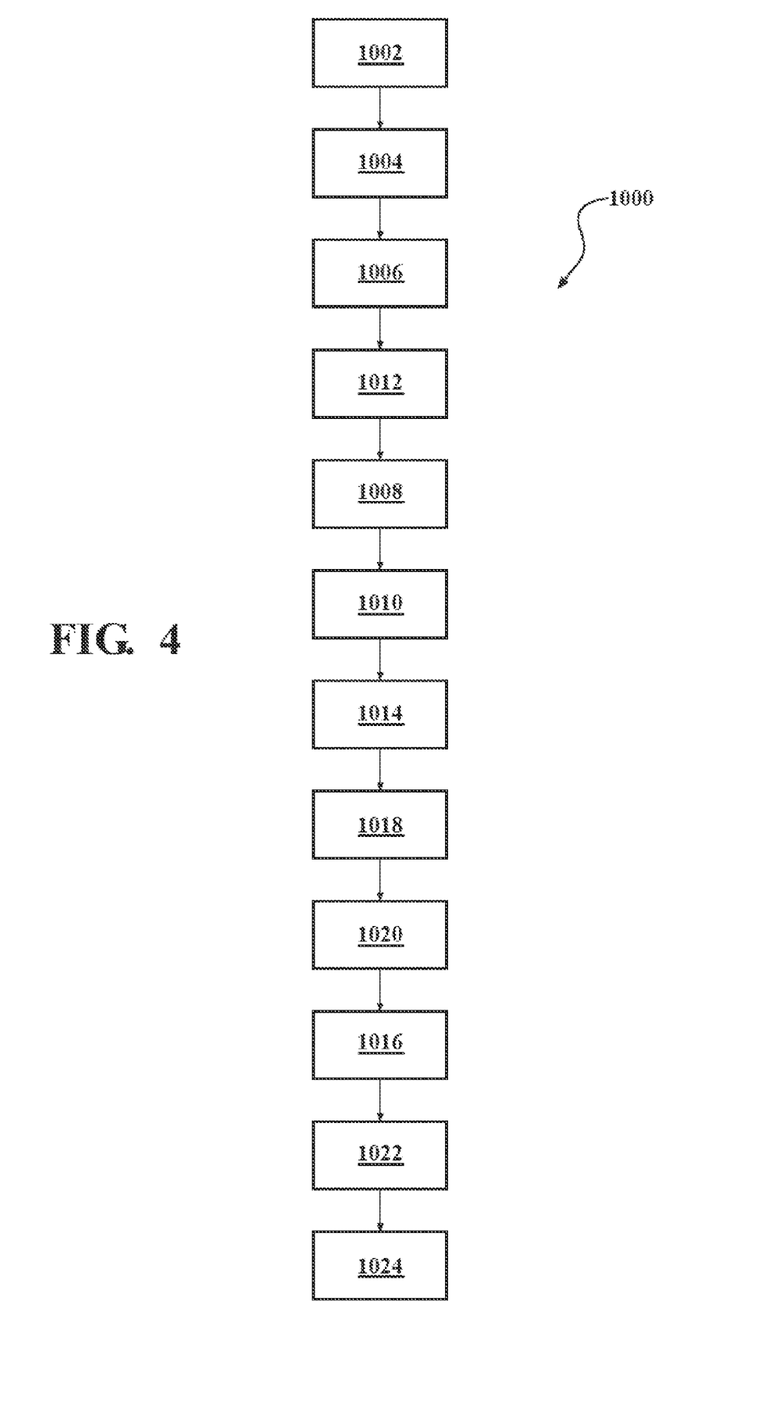
FIG. 4 is a schematic flowchart of a method of assembling a modular motor assembly in the transmission.

Turning to FIGS. 1 and 4, the present disclosure also provides a method 1000 of assembling the modular motor assembly in the transmission 10 of the vehicle. The method 1000 includes providing 1002 the housing 12 defining the cavity 14 along the longitudinal axis 16. In certain embodiments, the housing 12 is provided with the cavity 14 exposed or opened before closing the cavity 14 with one of the first and second distal walls 18, 20. Therefore, providing 1002 the housing 12 can include providing the housing 12 with the cavity 14 open. In various embodiments, when the cavity 14 is open, one of the first and second distal walls 18, 20 are detached from the housing 12 to expose or open the cavity 14. Therefore, the method 1000 can also include detaching 1004 one of the first and second distal walls 18, 20 to open the cavity 14 of the housing 12. In one embodiment, the second distal wall 20 is detached from the cavity 14.

The method 1000 also includes mounting 1006 the first motor/generator 22 to the first support 32 to define the first modular unit and mounting 1008 the second motor/generator 24 to the second support 34 to define the second modular unit. The first and second modular units define the modular motor assembly. The first and second motor/generators 22, 24 are mounted to the first and second supports 32, 34 respectively to enhance packaging space of the first and second motor/generators 22, 24.

The method 1000 also includes inserting 1010 the first and second modular units into the cavity 14 of the housing 12 along the longitudinal axis 16. Hence, the modular motor assembly is inserted into the cavity 14. As discussed above, the first and second motor/generators 22, 24 each include the rotor 26, the stator 28 and the resolver 30 to further define the first and second modular units respectively. Therefore, inserting 1010 the first and second modular units into the cavity 14 of the housing 12 can include inserting the first modular unit including the rotor 26, the stator 28 and the resolver 30 of the first motor/generator 22 into the cavity 14 of the housing 12 along the longitudinal axis 16 and inserting the second modular unit including the rotor 26, the stator 28 and the resolver 30 of the second motor/generator 24 into the cavity 14 of the housing 12 along the longitudinal axis 16 after inserting the first modular unit into the cavity 14. Simply stated, the first modular unit is inserted into the cavity 14 before the second modular unit. The first and second modular units simplify assembly of the first and second motor/generators 22, 24 in the cavity 14 of the housing 12 by pre-mounting the first motor/generator 22 to the first support 32 and pre-mounting the second motor/generator 24 to the second support 34 before being inserted into the cavity 14.

As briefly discussed above, the first support 32 includes the first body 36 having the finger 120 defining the groove 122 transverse to the longitudinal axis 16. Therefore, inserting 1010 the first and second modular units into the cavity 14 can include engaging the groove 122 of the finger 120 to insert the first modular unit into the cavity 14 of the housing 12. More specifically, the machine or robot engages the groove 122 of the finger 120 to move and insert the first modular unit in the cavity 14. Furthermore, the machine or robot can position the first modular unit as desired in the cavity 14.

As also briefly discussed above, the second support 34 includes the second body 60 having the flange 62 defining the slot 124 transverse to the longitudinal axis 16. The flange 62 is referred to as the second flange 62 for the discussion below. As such, inserting 1010 the first and second modular units into the cavity 14 can include engaging the slot 124 of the second flange 62 to insert the second modular unit into the cavity 14 of the housing 12. More specifically, the machine or robot engages the slot 124 of the second flange 62 to move and insert the second modular unit in the cavity 14. Furthermore, the machine or robot can position the second modular unit as desired in the cavity 14.

In certain embodiments, the method 1000 can include attaching 1012 the second clutch 56 to the first modular unit before inserting 1010 the first modular unit into the cavity 14. More specifically, attaching 1012 the second clutch 56 to the first modular unit can include attaching the second clutch 56 to the rotor 26 of the first motor/generator 22. Therefore, in certain embodiments, inserting the first modular unit including the rotor 26, the stator 28 and the resolver 30 of the first motor/generator 22 into the cavity 14 can include inserting the second clutch 56 and the first modular unit including the rotor 26, the stator 28 and the resolver 30 of the first motor/generator 22 into the cavity 14 of the housing 12 together, simultaneously. As mentioned above, FIG. 3 illustrates how the first and second modular units would look attached to each other when in the cavity 14.

The method 1000 further includes attaching 1014 the first support 32 to the housing 12 within the cavity 14. Furthermore, the method 1000 includes attaching 1016 the second support 34 to the first support 32 to assemble the modular motor assembly in the transmission 10 such that the first and second modular units align with each other along the longitudinal axis 16 within the cavity 14 of the housing 12. Therefore, assembly of the first and second modular units can be simplified because the first and second modular units can be inserted into the cavity 14 through the same side of the housing 12, and thus easily align with each other. Aligning the first and second modular units along the longitudinal axis 16 enhances packaging space of the first and second motor/generators 22, 24 within the cavity 14 of the housing 12.

Generally, attaching 1014 the first support 32 to the housing 12 occurs before attaching 1016 the second support 34 to the first support 32. Simply stated, the first modular unit is attached to the housing 12 before the second modular unit is attached to the first modular unit. Furthermore, the method can include attaching 1018 the first clutch 50 to the first lip 44 after attaching 1014 the first support 32 to the housing 12 and coupling 1020 the first planetary gear set 52 to the first clutch 50 after attaching 1014 the first support 32 to the housing 12. Therefore, generally, attaching 1018 the first clutch 50 to the first lip 44 occurs before attaching 1016 the second support 34 to the first support 32 and coupling 1020 the first planetary gear set 52 to the first clutch 50 occurs before attaching 1016 the second support 34 to the first support 32. In certain embodiments, the first clutch 50 can be attached to the first lip 44 before attaching 1014 the first support 32 to the housing 12 or before inserting 1010 the first modular unit into the cavity 14. It is to be appreciated that the first and second modular units can be attached to each other before being inserted into the cavity 14. Therefore, in certain embodiments, the first and second modular units can be inserted into the cavity 14 together, simultaneously. It is to be appreciated that the first and second supports 32, 34 can include additional features or components to allow the first and second modular units to be inserted into the cavity 14 together.

Attaching 1014 the first support 32 to the housing 12 can further include attaching the coupler 86 to the first support 32 before inserting the first modular unit into the cavity 14 of the housing 12 and attaching the coupler 86 to the housing 12 to secure the first modular unit to the housing 12 within the cavity 14. In addition, attaching 1016 the second support 34 to the first support 32 can further include attaching the second support 34 to the coupler 86 after attaching the coupler 86 to the housing 12 to secure the first and second modular units to each other such that the first and second modular units align with each other along the longitudinal axis 16 within the cavity 14 of the housing 12. Generally, attaching the coupler 86 to the housing 12 occurs after attaching the coupler 86 to the first modular unit. In certain embodiments, the coupler 86 can be attached to the housing 12 before attaching the coupler 86 to the first modular unit.

More specifically, attaching the coupler 86 to the first support 32 can include attaching the plurality of couplers 86 to the first support 32 before inserting the first modular unit into the cavity 14 of the housing 12. In certain embodiments, attaching the couplers 86 to the first support 32 can further include inserting the couplers 86 through respective first abutments 80. In addition, attaching the coupler 86 to the housing 12 can include attaching the plurality of couplers 86 to the housing 12 to secure the first modular unit to the housing 12 within the cavity 14. Furthermore, attaching the second support 34 to the coupler 86 can include attaching the second support 34 to the plurality of couplers 86 after attaching the couplers 86 to the housing 12. In certain embodiments, attaching the second support 34 to the couplers 86 can include inserting the couplers 86 through respective second abutments 82.

Additionally, the method 1000 can further include attaching 1022 the connector 98 to the coupler 86 to secure together the first and second modular units. More specifically, attaching 1022 the connector 98 to the coupler 86 can include attaching the plurality of connectors 98 to respective couplers 86 to secure together the first and second modular units. Attaching the connectors 98 to the couplers 86 can occur after attaching the second support 34 to the couplers 86. Generally, attaching the connectors 98 to the couplers 86 secures the first and second supports 32, 34 together. It is to be appreciated that when the first and second modular units are attached to each other before being inserted into the cavity 14, the couplers 86 are inserted through respective first and second abutments 80, 82, and the connectors 98 are attached to the couplers 86 after inserting the couplers 86 through respective first and second abutments 80, 82.

After the first and second modular units are inserted into the cavity 14 and secured to the housing 12 in the cavity 14 as discussed above, one of the first and second distal walls 18, 20 is attached to the housing 12 to close the cavity 14. Therefore, the method 1000 can further include attaching 1024 one of the first and second distal walls 18, 20 to the housing 12 to close the cavity 14 after inserting 1010 the first and second modular units into the cavity 14 and after attaching the connectors 98 to the couplers 86. In one embodiment, the second distal wall 20 is attached to the housing 12 to close the cavity 14. It is to also be appreciated that the method 1000 can include other features not specifically identified in the flowchart of FIG. 4.

While the best modes for carrying out the disclosure have been described in detail, those familiar with the art to which this disclosure relates will recognize various alternative designs and embodiments for practicing the disclosure within the scope of the appended claims.

The invention claimed is:

1. A transmission for a vehicle, the transmission comprising:
a housing defining a cavity along a longitudinal axis;
a first motor/generator and a second motor/generator each disposed in the cavity;
a first support supporting the first motor/generator such that the first motor/generator is mounted to the first support to define a first modular unit, with the first modular unit attached to the housing within the cavity;
a second support supporting the second motor/generator such that the second motor/generator is mounted to the second support to define a second modular unit, with the second modular unit attached to the first modular unit such that the first and second modular units align with each other along the longitudinal axis within the cavity of the housing; and
wherein the first and second motor/generators each include a rotor, a stator and a resolver, with the rotor, the stator and the resolver of the first motor/generator coupled to the first support to further define the first modular unit, and the rotor, the stator and the resolver of the second motor/generator coupled to the second support to further define the second modular unit;
wherein the stator of the second motor/generator includes a second mounting flange attached to the second support to secure the second motor/generator to the second support;
wherein the second support includes a second extension extending toward the first modular unit, with the second extension aligning with the second mounting flange, and further including a second fastener disposed through the second extension and the second mounting flange to secure the second motor/generator and the second support to each other.

2. A transmission as set forth in claim 1 wherein the first modular unit is disposed between a distal wall of the housing and the second modular unit within the cavity, and wherein the first support includes a first body extending radially relative to the longitudinal axis, with the first body including a first flange extending away from the second modular unit such that the first motor/generator is supported by the first body and the first flange.

3. A transmission as set forth in claim 2 wherein the first body of the first support includes a first lip extending toward the second modular unit such that the first lip and the first flange oppose each other relative to the first body, and further including a clutch attached to the first lip.

4. A transmission as set forth in claim 2 wherein the first body and the first flange define a first hole along the longitudinal axis, and further including a shaft disposed within the cavity, through the first hole of the first body and through the first hole of the first flange such that the first motor/generator surrounds the shaft.

5. A transmission as set forth in claim 2 wherein the second support includes a second body extending radially relative to the longitudinal axis, with the second body including a second flange extending toward the first modular unit such that the second motor/generator is supported by the second body and the second flange.

6. A transmission as set forth in claim 5 wherein the first body of the first support includes a first abutment extending toward the second body of the second support, and wherein the second body of the second support includes a second abutment extending toward the first body such that the first and second abutments align and engage each other to define a space between the first and second bodies, with the second motor/generator being disposed in the space between the first and second bodies.

7. A transmission as set forth in claim 6 further including a coupler disposed through the first and second abutments to secure the first and second modular units to each other within the cavity of the housing.

8. A transmission as set forth in claim 7 wherein the first abutment is further defined as a plurality of first abutments spaced from each other radially relative to the longitudinal axis and the second abutment is further defined as a plurality of second abutments spaced from each other radially relative to the longitudinal axis, with respective first and second abutments aligning and engaging each other to define the space between the first and second bodies, and with the second motor/generator disposed in the space, and wherein the coupler is further defined as a plurality of couplers such that one of the couplers is disposed through one pair of the first and second abutments, and another one of the couplers is disposed through another pair of the first and second abutments to secure the first and second modular units to each other within the cavity of the housing.

9. A transmission as set forth in claim 5 wherein the second body of the second support includes a second lip extending away from the first modular unit such that the second lip and the second flange oppose each other relative to the second body, and further including a bearing device mounted to the second lip.

10. A transmission as set forth in claim 9 wherein the second body, the second flange and the second lip define a second hole along the longitudinal axis, and further including a shaft disposed within the cavity, through the second hole of the second body, through the second hole of the second flange and through the second hole of the second lip such that the second motor/generator surrounds the shaft.

11. A transmission as set forth in claim 1 wherein the stator of the first motor/generator includes a first mounting flange attached to the first support to secure the first motor/generator to the first support.

12. A transmission for a vehicle, the transmission comprising:
   a housing defining a cavity along a longitudinal axis;
   a first motor/generator and a second motor/generator each disposed in the cavity;
   a first support supporting the first motor/generator such that the first motor/generator is mounted to the first support to define a first modular unit, with the first modular unit attached to the housing within the cavity; and
   a second support supporting the second motor/generator such that the second motor/generator is mounted to the second support to define a second modular unit, with the second modular unit attached to the first modular unit such that the first and second modular units align with each other along the longitudinal axis within the cavity of the housing;
   wherein the first and second motor/generators each include a rotor, a stator and a resolver, with the rotor, the stator and the resolver of the first motor/generator coupled to the first support to further define the first modular unit and the rotor, the stator and the resolver of the second motor/generator coupled to the second support to further define the second modular unit;
   wherein the stator of the first motor/generator includes a first mounting flange attached to the first support to secure the first motor/generator to the first support;
   wherein the first support includes a first extension extending away from the second modular unit, with the first extension aligning with the first mounting flange, and further including a first fastener disposed through the first extension and the first mounting flange to secure the first motor/generator and the first support to each other.

13. A method of assembling a modular motor assembly in a transmission of a vehicle, the method comprising:
   providing a housing defining a cavity along a longitudinal axis;
   mounting a first motor/generator to a first support to define a first modular unit;
   mounting a second motor/generator to a second support to define a second modular unit, with the first and second modular units defining the modular motor assembly;
   inserting the first and second modular units into the cavity of the housing along the longitudinal axis;
   attaching the first support to the housing within the cavity;
   attaching the second support directly to the first support to assemble the modular motor assembly in the transmission such that the first and second modular units align with each other along the longitudinal axis within the cavity of the housing; and
   wherein attaching the first support to the housing includes attaching a coupler to the first support before inserting the first modular unit into the cavity of the housing and attaching the coupler to the housing to secure the first modular unit to the housing within the cavity;
   wherein attaching the second support to the first support includes attaching the second support to the coupler after attaching the coupler to the housing to secure the first and second modular units to each other such that the first and second modular units align with each other along the longitudinal axis within the cavity of the housing.

14. A method as set forth in claim 13 wherein the first and second motor/generators each include a rotor, a stator and a resolver to further define the first and second modular units respectively, and wherein inserting the first and second modular units into the cavity of the housing includes:
   inserting the first modular unit including the rotor, the stator and the resolver of the first motor/generator into the cavity of the housing along the longitudinal axis; and
   inserting the second modular unit including the rotor, the stator and the resolver of the second motor/generator into the cavity of the housing along the longitudinal axis after inserting the first modular unit into the cavity.

15. A method as set forth in claim 13 wherein the first support includes a first body having a finger defining a groove transverse to the longitudinal axis, and wherein inserting the first and second modular units into the cavity includes engaging the groove of the finger to insert the first modular unit into the cavity of the housing.

16. A method as set forth in claim 13 wherein the second support includes a second body having a flange defining a slot transverse to the longitudinal axis, and wherein inserting the first and second modular units into the cavity includes engaging the slot of the flange to insert the second modular unit into the cavity of the housing.

* * * * *